US010250454B2

(12) United States Patent
Bell et al.

(10) Patent No.: US 10,250,454 B2
(45) Date of Patent: *Apr. 2, 2019

(54) COMPRESSING TOPOLOGICAL INFORMATION PERTAINING TO MANAGED RESOURCES TO ENHANCE VISUALIZATION

(71) Applicant: International Business Machines Corporation, Armonk, NY (US)

(72) Inventors: Denise A. Bell, Austin, TX (US); Roderick C. Bowser, Austin, TX (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 545 days.

This patent is subject to a terminal disclaimer.

(21) Appl. No.: 14/922,238

(22) Filed: Oct. 26, 2015

(65) Prior Publication Data
US 2016/0043908 A1    Feb. 11, 2016

Related U.S. Application Data

(63) Continuation of application No. 12/123,561, filed on May 20, 2008, now Pat. No. 9,172,616.

(51) Int. Cl.
*G06F 3/048* (2013.01)
*H04L 12/24* (2006.01)
(Continued)

(52) U.S. Cl.
CPC ............ *H04L 41/22* (2013.01); *G06F 3/0482* (2013.01); *G06F 3/04842* (2013.01); *G06F 3/04847* (2013.01)

(58) Field of Classification Search
CPC ... H04L 41/22; G06F 3/0482; G06F 3/04842; G06F 3/04847
(Continued)

(56) References Cited

U.S. PATENT DOCUMENTS 6,259,679 B1    7/2001   Henderson et al.
6,477,572 B1    11/2002  Elderton et al.
(Continued)

OTHER PUBLICATIONS

Office Action, dated Apr. 27, 2011, regarding U.S. Appl. No. 12/123,561, 10 pages.
(Continued)

*Primary Examiner* — Tadesse Hailu
*Assistant Examiner* — Darrin Hope
(74) *Attorney, Agent, or Firm* — Yee & Associates, P.C.; Joseph Petrokaitis (57) ABSTRACT

A method is provided in association with a managed system having a substantial number of resources. The method includes the step of selecting an attribute that is common to all of the resources, wherein each resource has a status in regard to the selected attribute that is one of a plurality of prespecified statuses that are available for the attribute. The method further includes compressing the group of resources into a set of subgroups, wherein each subgroup corresponds to a different prespecified status of the plurality, and each resource having a given status is placed into the subgroup that corresponds to the given status. Each of the subgroups is represented by a display element on a single computer display screen, and specified information is displayed with each display element, wherein the specified information for a display element pertains to all of the resources placed into the subgroup that are represented by the display element.

20 Claims, 5 Drawing Sheets

(51) Int. Cl.
*G06F 3/0482* (2013.01)
*G06F 3/0484* (2013.01)

(58) Field of Classification Search
USPC .......................................................... 715/738
See application file for complete search history.

(56) References Cited

U.S. PATENT DOCUMENTS

| | | |
|---|---|---|
| 6,850,255 B2 | 2/2005 | Muschetto |
| 7,827,476 B1 | 11/2010 | Roberts |
| 9,172,616 B2 | 10/2015 | Bell et al. |
| 2002/0165934 A1 | 11/2002 | Conrad et al. |
| 2007/0233854 A1 | 10/2007 | Bukovec et al. |
| 2009/0292997 A1 | 11/2009 | Bell et al. |

OTHER PUBLICATIONS

Final Office Action, dated Oct. 31, 2011, regarding U.S. Appl. No. 12/123,561, 17 pages.
Office Action, dated Jan. 16, 2014, regarding U.S. Appl. No. 12/123,561, 10 pages.
Final Office Action, dated Jul. 7, 2014, regarding U.S. Appl. No. 12/123,561, 10 pages.
Notice of Allowance, dated Jun. 22, 2015, regarding U.S. Appl. No. 12/123,561, 14 pages.

Configuration Options: — 402

Task Type
- ☑ Software Distribution
- ☐ Inventory Query
- ☐ Compliance Scan
- ☐ Other ______

Results Grouping — 404
- ☑ By Status
- ☐ By Endpoint Range
- ☐ By Location
- ☐ Other ______

Specify Categories and/or Grouping — 406

Status ☐ ▦ Succeeded ☑ ⊗ Cancelled ☐ Other ______
☐ ⚠ Timed Out ☐ ⊗ Failed — 408

Endpoint Range (# of items per group) ______

Locations (enter or pull from data) ______ — 410

Other ______

COMPRESSING TOPOLOGICAL INFORMATION PERTAINING TO MANAGED RESOURCES TO ENHANCE VISUALIZATION

CROSS-REFERENCE TO RELATED APPLICATION(S)

This application is a continuation of and claims the benefit of priority to U.S. patent application Ser. No. 12/123,561, filed on May 20, 2008, the contents of which are incorporated herein by reference.

BACKGROUND OF THE INVENTION

1. Field of the Invention

The invention disclosed and claimed herein generally pertains to a method and apparatus for displaying icons, symbols or other information, associated with a large number of systems management resources, on a single display screen. More particularly, the invention pertains to a method of the above type wherein a compression technique is used to enhance viewability or visualization of the displayed information. Even more particularly, the invention pertains to a method of the above type wherein a user is able to select from alternative approaches in organizing the information into a single topology view.

2. Description of the Related Art

It is very useful for systems management administrators to be able to visualize all the resources they manage at the same time, by displaying the resources together on a single display screen or the like. Such resources can include, without limitation, computing machines, computer related devices, and hardware and software components of many types that are incorporated into a system. At present, administrators may have to manage systems that include on the order of 100,000 devices and other components, and it is not possible to visualize this number of resources at once. More particularly, the user interface (UI) technology that is presently available for use by systems management administrators is generally limited by resolution, screen size and rendering capabilities. Accordingly, an administrator can view only a limited number of resources together, on a single screen.

As used herein, "topology" refers to the arrangement or organization of icons and other graphical elements on a UI display screen. Depending on screen size, resolution and software design of currently available user interfaces, on the order of around 50-500 resources can be depicted at one time on the screen. At lower numbers like 50, it is possible to display many characteristics about each resource, such as its type, name and status. Resource type is typically shown by an icon and/or a label, name is shown by a label, and status is indicated by a color. However, as the number of resources approaches 100 and above, the amount of displayed content has to be scaled back, so that a colored geometric symbol is the only thing available to display each individual resource.

Moreover, in the display of managed systems resources, it may be useful or necessary to illustrate the relationship between different resources. This may be comparatively simple if there is only a single relationship between two resources. However, as the number of resources of the system exceeds 100, and the relationships among different resources become increasingly complex and intertwined, it is increasingly difficult to achieve a useful display of the resources on a single screen.

BRIEF SUMMARY OF THE INVENTION

A method is provided in association with a managed system having a substantial number of resources. The method includes the step of selecting an attribute that is common to all of the resources, wherein each resource has a status in regard to the selected attribute that is one of a plurality of prespecified statuses that are available for the attribute. The method further includes compressing the group of resources into a set of subgroups, wherein each subgroup corresponds to a different prespecified status of the plurality, and each resource having a given status is placed into the subgroup that corresponds to the given status. Each of the subgroups is represented by a display element on a single computer display screen, and specified information is displayed with each display element, wherein the specified information for a display element pertains to all of the resources in the subgroup that are represented by the display element.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
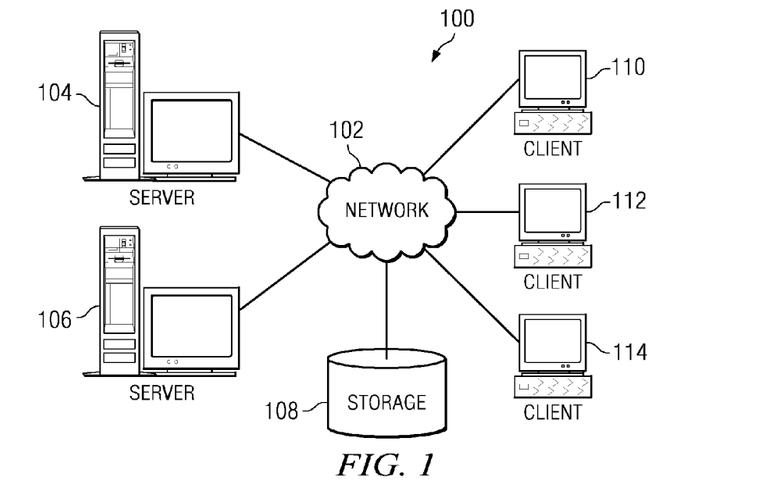
FIG. 1 is a block diagram depicting a systems environment in which embodiments of the invention may be used.

Referring to FIG. 1, there is shown a block diagram of a systems network 100, comprising data processing systems in which embodiments of the present invention may be implemented. Systems network 100 is a network of computers and other components that includes network 102, the medium used to provide communication links between various devices and computers connected together within systems network 100. These computers and devices may comprise resources of a system network 100 which are managed by a management systems administrator (not shown), and with which embodiments of the invention may be used. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network 102 of systems network 100 could be the Internet, including a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Systems network 100 also may be implemented as a number of different types of networks, such as for example, an intranet, a local area network (LAN), or a wide area network (WAN). FIG. 1 is intended as an example, and not as an architectural limitation for different embodiments of the present invention.

Figure 2:
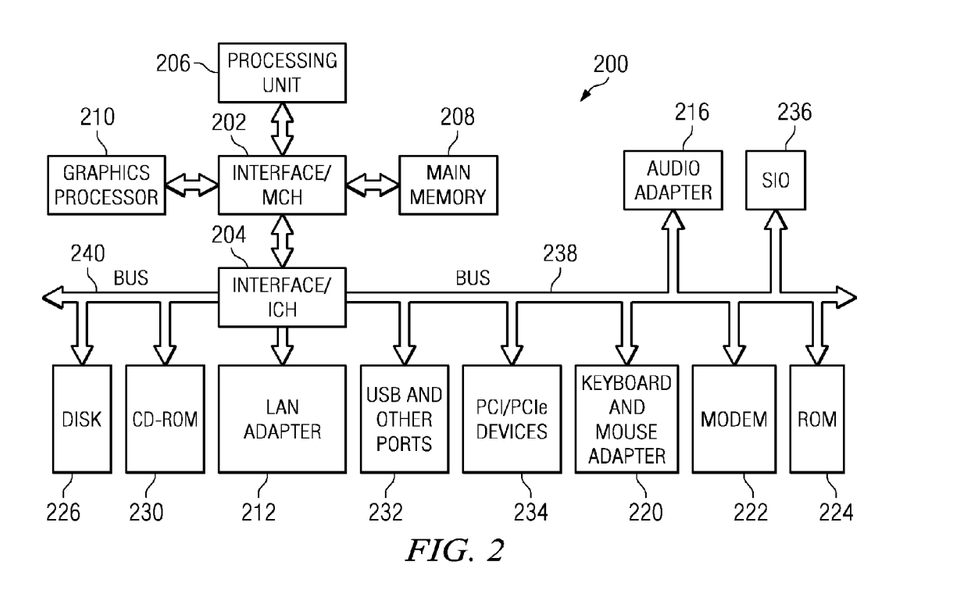
FIG. 2 is a block diagram showing a data processing system which may be used as one or more of the resources in the environment of FIG. 1, and may also be used in implementing embodiments of the invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Herein, "resource" is any resource in a system or network such as network 100, wherein the network is managed by an administrator and may include, without limitation, computers, servers, endpoints, printers, software applications, and other hardware and software devices and components. In accordance with embodiments of the invention, when the number of resources associated with a view generated for presentation exceeds a pre-specified threshold, respective resources will be compressed by gathering them into a plurality of subgroups. The grouping is carried out by identifying the particular resources that all have a prespecified common trait or characteristic. The identified resources are each assigned to or placed in a single subgroup, which is then represented in a topological view by a single icon, label, or other graphic display element.

A number of different traits or attributes are available for use in assigning resources to respective subgroups. For example, all resources having a common relationship to a single resource could be assigned to the same subgroup. Other bases for assignment could be all resources having a common set of relationships to the same set of resources, and resources having a common value for a significant attribute. The value of an attribute would be a characteristic that differentiated the subgroups from one another, such as resource type, location, or status.

As an important feature of embodiments of the invention, a system administrator or other user can be provided with the capability to select alternative approaches in organizing and displaying systems management resources in a graphical topology view. More particularly, a user could select particular attributes or other bases, from a set of options or alternatives, for use in compressing a large group of resources into a single display. Moreover, a user could select different alternatives to configure different topology views of the same group of resources, and then compare them to determine which was most appropriate.

Figure 3:
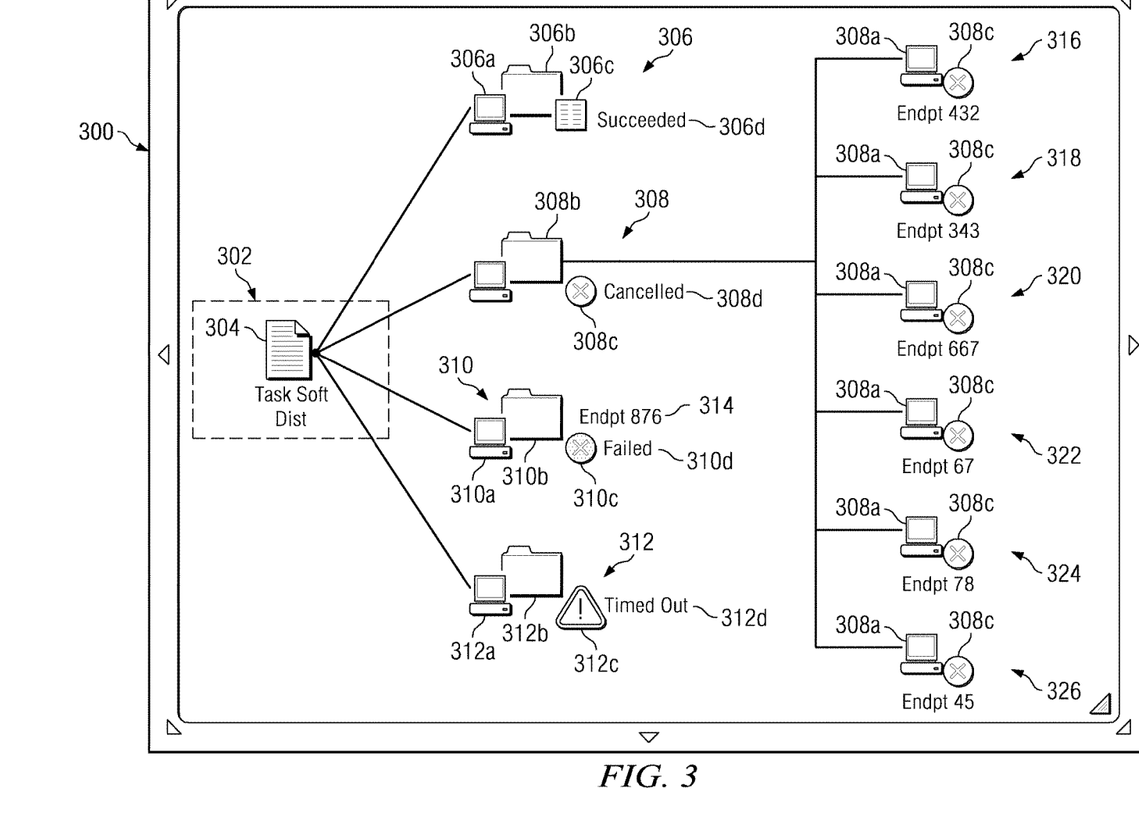
FIG. 3 is a schematic diagram illustrating a displayed view of compressed resource information, in accordance with an embodiment of the invention.

Referring to FIG. 3, there is shown a view 300 constructed in accordance with an embodiment of the invention, as described above, wherein view 300 is associated with a number of resources of a managed system. More particularly, a server 302, such as a server 104 or the like, must perform the task of distributing a specified software component 304 to a number of computer clients or other resources of the managed network, which are respectively described as endpoints. Each endpoint depicted in FIG. 3 is shown with a system identification number.

In performing the distribution task, four different results are possible. That is, distribution of the software to an endpoint could have been successful; it could have failed; it could have been in process when a timeout condition occurred, before distribution was completed; or distribution likewise could have been in process when the target resource receiving the software canceled the connection with the distributing source resource. In implementing the embodiment of the invention, the user decides to select this task as the trait or attribute to be used in constructing the view of FIG. 3. The user decides further that endpoint resources will be assigned to different subgroups, according to their respective results in receiving the distributed software. Finally, the user selects additional detail to be provided for viewing results associated with distribution efforts that were canceled.

Referring further to FIG. 3, there is shown the topological arrangement for these selections of the user. An icon or other display element 306 collectively represents all of the endpoints that received the distributed software successfully. The icon 306 comprises a computer symbol component 306a and a file symbol component 306b. The file symbol is provided to graphically inform a user that icon 306 represents a particular subgroup. Icon 306 further includes a uniquely colored geometric feature 306c, such as a green square, and is accompanied by a label 306d. The label 306d visually indicates that icon 306 represents the subgroup of resources that successfully received the software.

Similarly, icons 308, 310 and 312 represent the subgroups of resources for which software distribution was canceled, failed, and timed out, respectively, as shown by respective labels 308d, 310d and 312d. Components 308a-312a and 308b-312b are similar or identical to components 306a and 306b, respectively. Component 308c usefully comprises a red circle, component 310c comprises a black circle, and component 312c comprises a yellow triangle. FIG. 3 further shows a label 314 displayed with icon 310. This label is used when only a single resource is contained in the subgroup represented by an icon, which in this case is the resource with identification number 876.

As a result of the user selecting additional detail in regard to canceled software distribution efforts, view 300 further depicts endpoint resources 316-326, which are all of the resources included in the canceled subgroup of icon 308. A user is thereby quickly and conveniently informed of the identities of these resources. Such information may be used, for example, to attempt further redistribution efforts for these resources.

It is to be understood that the contents of the subgroup of icon 308, comprising resources 316-326, would be displayed in view 300 only if the total number of resource symbols would not exceed a pre-specified threshold. This threshold is determined by a maximum allowable number of graphic display elements, and by topographical considerations. It is to be further understood that by compressing a number of resources into subgroups as described above, space in the view is made available for viewing resources of particular interest in greater detail. Accordingly, embodiments of the invention are usefully provided with a software component to implement the thresholding feature.

Figure 4:
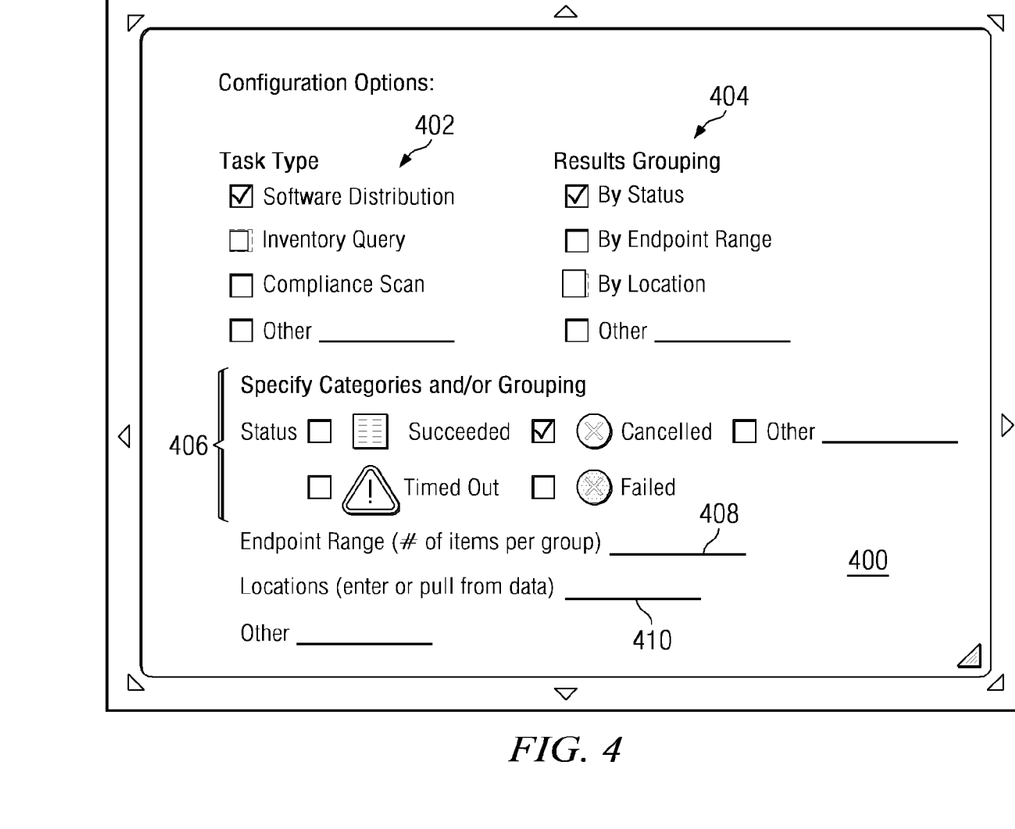
FIG. 4 is a screen showing controls that can be manipulated by a user to implement the embodiment of FIG. 3.

Referring to FIG. 4, there is shown a screen 400 which displays control elements that a user may operate to implement the topographical view depicted by FIG. 3. Thus, FIG. 4 shows software distribution selected from a task type menu 402, wherein task type provides a basis or attribute that is common to all of the managed resources. Thus, this attribute can be used to assign respective resources to different subgroups. Other tasks shown by menu 402 that are common to all resources, by way of example and not limitation, are inventory query and compliance scan.

Referring further to FIG. 4, there is shown status selected from a results grouping menu 404, for use in identifying respective subgroups to which resources may be assigned. Menu 404 also includes, by way of example and not limitation, endpoint range and location. For endpoint range grouping, all endpoint resources would be consecutively numbered and placed in subgroups of a particular size, such as subgroups of 50 resources, according to their respective numbers. The user could select a subgroup size at line 408 of FIG. 4. Location grouping would be based on geographic location of respective resources. The user could indicate one or more locations at line 410 of FIG. 4.

FIG. 4 further shows menu 406, for specifying categories and/or groupings. The status "canceled" is selected in menu 406, in accordance with the user's particular interest in this subgroup as described above, in connection with FIG. 3.

Figure 5:
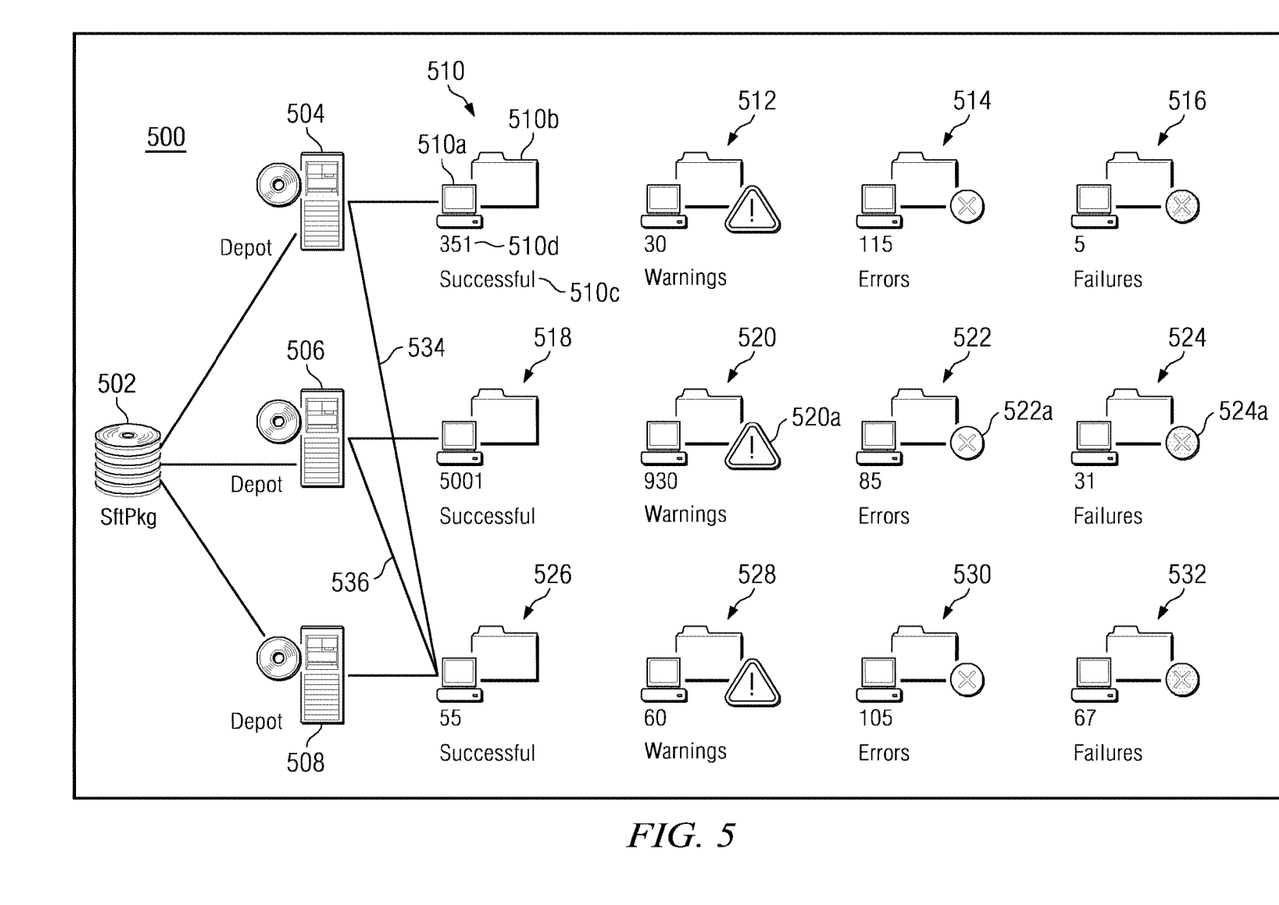
FIG. 5 is a schematic diagram illustrating a displayed view of a further embodiment of the invention.

Referring to FIG. 5, there is shown a screen view 500 associated with a further embodiment of the invention. View 500 represents the results of an effort to distribute a software package 502 to a large number of target resources of a managed system. For each type of resource, the distribution effort has had one of four possible results, including successes, issue of warnings, errors, and failures. Moreover, FIG. 5 indicates that three source resources, comprising depots 504, 506, and 508, were used to distribute this software, wherein each depot distributed the software package 502 to a different portion or subset of the total target resources.

Referring further to FIG. 5, there are shown icons 510-516 which are each associated with depot 504. More particularly, each target resource involved in distribution of software from depot 504 is included in a subgroup represented by one of these four icons. A target resource is thus represented by icon 510 if the software distribution effort was successful; by icon 512 if a warning resulted from the effort; by icon 514 if there was an error; and by icon 516 if the effort failed. FIG. 5 further shows a similar set of icons 518, 520, 522, and 524, for the target resources associated with depot 506, and icons 526, 528, 530, and 532, for the icons associated with depot 508.

FIG. 5 shows each subgroup icon comprising a computer symbol component such as 510a, and also a file symbol component such as 510b, wherein file component 510b is similar to component 306b of FIG. 3. Each icon further comprises a label, such as 510c, that indicates the status of the resources in the subgroup represented by the icon. A label, such as 510d, is also provided to indicate the total number of resources in the associated subgroup. Thus, the subgroup represented by icon 510 contains 351 resources which all received the software package 502 successfully, from depot 504. Similarly, the subgroup represented by icon 518 contains 5001 resources, which all received the software package 502 successfully from depot 506.

Some of the icons include geometric symbols, such as 520a, 522a, or 524a, which are similar or identical to components 312c, 308c, and 310c, respectively, as shown in FIG. 3.

As described above, target resources in the embodiment of FIG. 5 are assigned to respective subgroups, on the basis of task result, and also in view of the particular depot that supplied software 502. This illustrates that resources can be placed into subgroups on the basis of multiple traits or attributes, which might all be selected by a user. The embodiment of FIG. 5 further illustrates the feature, in like manner with the embodiment of FIG. 3, that a subgroup of resources can be represented in a displayed view by a single icon or other display element. Moreover, FIG. 5 shows paths 534 and 536, in order to indicate that depot 508 has a relationship with some or all of the resources associated with icons 510-516, and with icons 518-524, respectively. Notwithstanding these relationships, however, the embodiment of FIG. 5 still groups each resource according to the single relationship of the depot that sent the software package 502 to the resource.

In a further embodiment of the invention, a distinct bordering shape, such as a disk, an ellipse or similar shape can be used to denote that there are multiple objects being represented by a particular icon or other symbol or graphic element. The same border could be reused around any topology item, and would be quickly recognizable as a user created or automatically grouped compressed resource. Moreover, using stacking together with a border for each represented group would create more space on the display screen.

Figure 6:
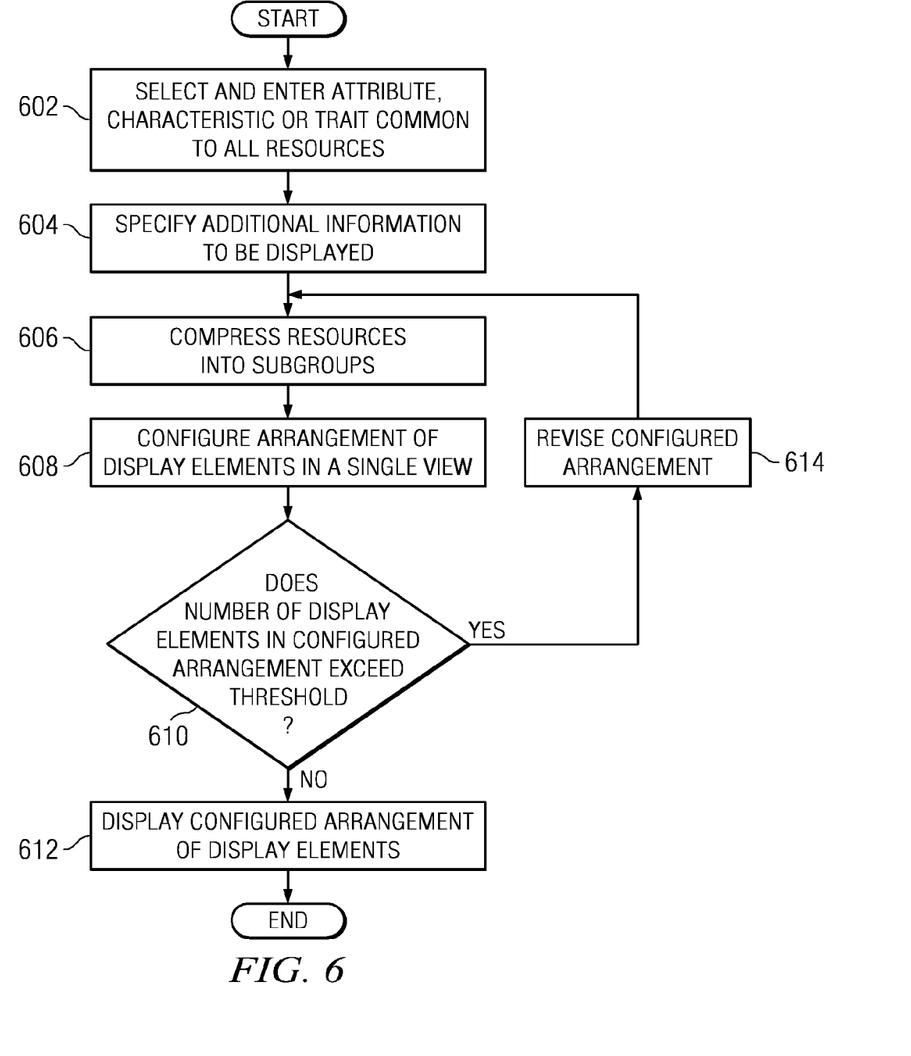
FIG. 6 is a flowchart showing principal steps for a method comprising an embodiment of the invention.

Referring to FIG. 6, there are shown principal steps for a method or process in accordance with an embodiment of the invention. At step 602, a system management administrator or other user selects and enters a trait or attribute into a data processing system that operates a display screen or the like, wherein the trait or attribute is common to each of a large group of resources. The attribute is associated with information pertaining to the resources that the user seeks to represent visually. Such information could pertain to the results of an effort to perform a task, as described above in connection with FIG. 3. Moreover, the user could select multiple traits, such as the results of software distribution, and also the different depots used for distribution, as described above in connection with FIG. 5.

At step 604, the user may specify additional information for the desired visual representation, such as depicting in detail each resource that is contained in a particular subgroup, as described above in connection with FIG. 3. At step 606 the data processing system compresses the resources into respective subgroups. An arrangement of display elements is configured at step 608, wherein each display element represents a subgroup or other information that is to be graphically displayed.

Referring further to FIG. 6, it is determined at step 610 whether the number of display elements in the arrangement exceeds a prespecified threshold value. If not, the configured arrangement is displayed on the screen, and the process of FIG. 6 ends. Otherwise, the arrangement must be revised at step 614. This may be done automatically by the data processor, or in connection with further user selection of information that is to be displayed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a managed system having a substantial number of resources included in a group of resources, a method comprising the steps of:
    selecting an attribute that is common to said group of resources, wherein each resource of said group of resources has a status in regard to said selected attribute that is one of a plurality of prespecified statuses available for said attribute;
    compressing said group of resources into a set of subgroups, wherein each subgroup of said set of subgroups corresponds to a different prespecified status of said plurality of prespecified statuses, and each resource of said group of resources having a given status of the plurality of prespecified statuses is placed into a given subgroup of said set of subgroups corresponding to said given status;
    representing each of said subgroups of said set of subgroups as a display element on a single computer display screen; and
    displaying specified information with each display element that pertains to the resources in the subgroup represented by the display element, wherein:
    the number of discrete display elements displayed on said display screen does not exceed a prespecified threshold, and the compressing step is performed responsive to a number of resources associated with a view generated for presentation exceeding the prespecified threshold.

2. The method of claim 1, wherein:
said attribute is selected by a user of said managed system from a plurality of available attributes.

3. The method of claim 2, wherein:
said selected attribute comprises a task that is performed and involves each of said resources, and the status of a resource indicates a result of task performance of performing the task with respect to the resource.

4. The method of claim 3, wherein:
at least one of said resources comprises a target resource having relationships with each of multiple source resources, wherein said target resource is placed in one of said subgroups according to the result of task performance involving only a particular one of said source resources.

5. The method of claim 2, wherein:
said user is enabled to select a viewable arrangement for said display screen that presents more information in regard to the contents of one of said subgroups than is presented in regard to the contents of another of said subgroups.

6. The method of claim 2, wherein:
resources are placed into respective subgroups on the basis of a plurality of attributes that are each selected by said user.

7. The method of claim 1, wherein:
said selected attribute comprises a task that is performed by each of said resources, and the status of the resource indicates a result of task performance of the task by the resource, and wherein each of said display elements comprises an icon that indicates the result of the task performance.

8. The method of claim 7, wherein:
at least a given one of said display elements includes a symbol indicating that the subgroup represented by the given display element contains a plurality of said resources.

9. The method of claim 7, wherein:
said displayed specified information includes the number of resources placed into each of said subgroups.

10. The method of claim 1, further comprising:
    configuring said set of subgroups as an arrangement of display elements in a single view;
    responsive to configuring said set of subgroups as an arrangement of display elements in a single view, determining whether a number of display elements in the arrangement exceeds a prespecified threshold; and
    responsive to determining that the number of display elements exceeds the prespecified threshold, revising the arrangement and repeating the compressing step using the revised arrangement.

11. In association with a managed system having a substantial number of resources included in a group of resources, a computer program product comprising executable computer instructions stored in a non-transitory computer readable storage medium, the computer instructions comprising:
    instructions for selecting an attribute that is common to said group of resources, wherein each resource of said group of resources has a status in regard to said selected attribute that is one of a plurality of prespecified statuses available for said attribute;
    instructions for compressing said group of resources into a set of subgroups, wherein each subgroup of said set of subgroups corresponds to a different prespecified status of said plurality of prespecified statuses, and each resource of said group of resources having a given status of the plurality of prespecified statuses is placed into a given subgroup of said set of subgroups corresponding to said given status;
    instructions for representing each of said subgroups of said set of subgroups as a display element on a single computer display screen; and
    instructions for displaying specified information with each display element that pertains to the resources in the subgroup represented by the display element, wherein:
    the number of discrete display elements displayed on said display screen does not exceed a prespecified threshold, and the compressing step is performed responsive to a number of resources associated with a view generated for presentation exceeding the prespecified threshold.

12. The computer program product of claim 11, wherein:
said attribute is selected by a user of said managed system from a plurality of available attributes.

13. The computer program product of claim 12, wherein:
said selected attribute comprises a task that is performed and involves each of said resources, and the status of a resource indicates a result of task performance of performing the task with respect to the resource.

14. The computer program product of claim 12, wherein:
said user is enabled to select a viewable arrangement for said display screen that presents more information in regard to the contents of one of said subgroups than is presented in regard to the contents of another of said subgroups.

15. The computer program product of claim 11, wherein the instructions further comprise:
    instructions for configuring said set of subgroups as an arrangement of display elements in a single view;
    instructions, responsive to configuring said set of subgroups as an arrangement of display elements in a single view, for determining whether a number of display elements in the arrangement exceeds a prespecified threshold; and instructions, responsive to determining that the number of display elements exceeds the prespecified threshold, for revising the arrangement and repeating the compressing step using the revised arrangement.

16. The apparatus of claim 11, wherein the instructions are further configured to perform, when executed by the data processor, steps of:
configuring said set of subgroups as an arrangement of display elements in a single view;
responsive to configuring said set of subgroups as an arrangement of display elements in a single view, determining whether a number of display elements in the arrangement exceeds a prespecified threshold; and
responsive to determining that the number of display elements exceeds the prespecified threshold, revising the arrangement and repeating the compressing step using the revised arrangement.

17. In association with a managed system having a substantial number of resources included in a group of resources, an apparatus comprising a data processor coupled to a storage device having instructions stored therein that are configured to perform, when executed by the data processor, steps of:
specifying an attribute that is common to said group of resources, wherein each resource of said group of resources has a status in regard to said selected attribute that is one of a plurality of prespecified statuses available for said attribute;
compressing said group of resources into a set of subgroups, wherein each subgroup of said set of subgroups corresponds to a different prespecified status of said plurality of prespecified statuses, and each resource of said group of resources having a given status of the plurality of prespecified statuses is placed into a given subgroup of said set of subgroups corresponding to said given status;
representing each of said subgroups of said set of subgroups as a display element on a single computer display screen; and
displaying specified information with each display element that pertains to the resources in the subgroup represented by the display element, wherein:
the number of discrete display elements displayed on said display screen does not exceed a prespecified threshold, and the compressing step is performed responsive to a number of resources associated with a view generated for presentation exceeding the prespecified threshold.

18. The apparatus of claim 17, wherein:
said attribute is selected by a user of said managed system from a plurality of available attributes.

19. The apparatus of claim 18, wherein said selected attribute comprises a task that is performed and involves each of said resources, and the status of a resource indicates a result of task performance of performing the task with respect to the resource.

20. The apparatus of claim 18, wherein:
said user is enabled to select a viewable arrangement for said display screen that presents more information in regard to the contents of one of said subgroups than is presented in regard to the contents of another of said subgroups.

* * * * *